INVENTOR.
Wallace W. Ward
BY
Emery, Whittemore, Sandoe & Graham
ATTORNEYS

United States Patent Office 3,147,324
Patented Sept. 1, 1964

3,147,324
METHODS OF COVERING GOLF BALLS
Wallace W. Ward, Chatham, N.J., assignor to
Louis F. Muccino, Rye, N.Y.
Filed Oct. 20, 1960, Ser. No. 63,764
2 Claims. (Cl. 264—254)

This invention relates to methods of covering golf balls.

Golf balls, as currently manufactured, sold and used usually comprise a central, spherical core on which a layer of rubber strand, either thread or tape, is wound under tension. The resulting wound core is usually referred to as "center," and is also spherical in shape. The ball is completed by applying a cover to the center.

From the early days of the game of golf, balata and gutta percha have been the preferred materials for use in golf ball covers. Such materials are thermoplastic and are easily molded by application of heat and pressure, and even if used in unvulcanized condition are reasonably tough and resistant to damage. As the science of rubber technology has advanced, and as the demands of golf players for better covers have been made known, various improvements have been made. In some cases balata has been compounded with gutta percha, and in other cases balata or gutta percha or mixtures of the two have been compounded with rubber or various other ingredients believed to improve the characteristics of the cover stock. In order to increase the toughness of the cover stock, it is now common practice to vulcanize or cure the covers, and improvements have also been made from time to time in vulcanizing and accelerating agents and in processes or procedures for vulcanizing or curing the covers.

In all cases, however, regardless of the nature of the cover stock, the method of applying the cover to the center has been substantially similar. That is, the selected cover stock has been warmed and molded to form hollow elliptical cups. The inside diameter of the cups has been somewhat less than the outside diameter of the center and the outside diameter of the cups has been somewhat less than the outside diameter of a finished ball. Two such cups have then been pressed onto opposite sides of a center, but without bringing the edges of the cups into contact. The assembled center and cups have then been placed between the herispherical cavities of a mold which has then been placed in a hot plate press. As the cover stock was heated and softened by the heat of the mold, the mold parts were gradually brought together by the press to apply heat and pressure to cause the cover stock to flow. In doing so, the softened cover stock was forced into the interstices between the outer windings of the center and caused to adhere thereto. At the same time, the usual shallow depressions, commonly known as "dimples," have been formed in the outer surface of the cover by suitable protrusions projecting outwardly from the surfaces of the mold cavity.

The prolonged exposure to heat (temperatures in the region of 220° F. are commonly used) required to mold the cover stock onto the center and to vulcanize or partially vulcanize the cover has long been known to have a deleterious effect on the rubber windings of the center. It frequently causes breakage of the tensioned rubber strands, causes non-uniform compression, and is a serious source of rejects in the manufacturing process.

Various expedients have been proposed from time to time in order to reduce the duration of exposure to heat, but in all cases known to me, in order to make a satisfactory cover, it has been necessary to utilize a relatively high temperature for a period of time sufficient to damage the tensioned windings of the center, and more particularly the outer windings thereof.

In a copending application of applicant Louis F. Muccino, filed October 3, 1958, Serial No. 765,209, and now abandoned, a method of covering golf balls has been disclosed in which liquid urethane polymers are used as cover materials. Such polymers may be applied, set and cured at normal room temperatures or at temperatures less than sufficient to damage the tensioned windings of the center. In that application a golf ball center having an outside layer of rubber strand wound under tension is suspended concentrically within a spherical mold cavity of a diameter greater than that of the center, so that a space of uniform thickness lies between the outside surface of the center and the inside surface of the cavity. A liquid urethane polymer is injected into said space, and the cover is then set and cured. In that application, the center is suspended concentrically within the mold cavity by means of pins propecting radially inwardly from the surfaces of the mold cavity.

In a subsequent copending application of Louis F. Muccino and the present applicant filed December 1, 1959, Serial No. 856,465 and now abandoned, another method of covering a golf ball has been disclosed in which liquid urethane polymers are also used as cover materials. In said application a metered quantity of the polymer is deposited in a mold half having a spherical cavity therein and a golf ball center is pressed into the polymer until the center is concentric with the cavity. The suspended center is held in concentric position until the polymer is set. Then a second mold half having a spherical mold cavity is placed in register with the first half, and additional polymer is injected into the second half. The mold is then closed.

It is an object of the present invention to provide an improved method of covering a golf ball with a liquid urethane polymer and in particular an improved method of suspending the golf ball center within the mold cavity and filling the mold cavity with the liquid polymer.

Other objects and advantages of the invention will appear hereinafter.

A preferred embodiment of the invention selected for purposes of illustration is shown in the accompanying drawings, in which, FIGURE 1 is a section through a two piece book mold, showing a metered quantity of liquid polymer deposited in one mold half cavity.

Figure 1:
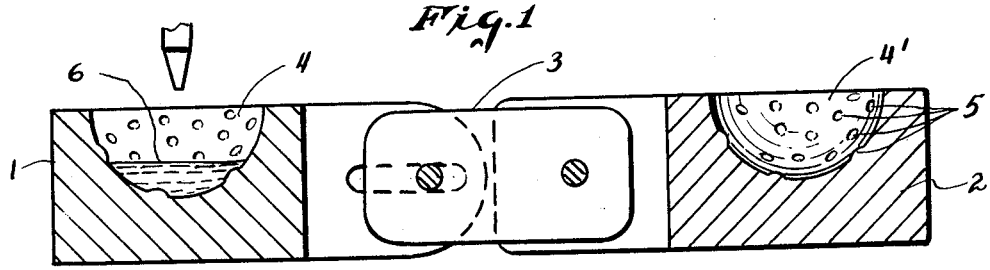
Figure 2:
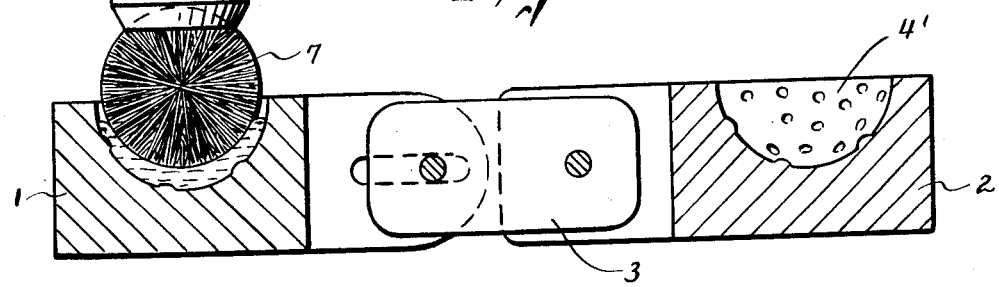
FIGURE 2 is a similar view showing a golf ball center about to be placed in the mold cavity.

Several liquid urethane polymers are suitable for use according to the process of the present invention. Such polymers have the advantage that they are liquid at normal room temperatures or at slightly elevated temperatures of 100° to 125° F., and that after compounding with a suitable curing agent, they set up very quickly at normal room temperatures or at slightly elevated temperatures, and that they may be cured at normal room temperatures. Thus, the polymer may be applied, set and cured at temperatures far below those which damage the tensioned windings.

A specific example of liquid urethane polymers suitable for use according to the present invention is a product of E. I. du Pont de Nemours & Co. (Inc.) and sold under the name Adiprene L. It is described as a fully saturated urethane polymer of the polyether type which contains 4.0 to 4.3% of isocyanate groups, by weight. It is an odorless, honey colored liquid having a specific gravity of 1.06 and a viscosity of 14,000–19,000 c.p.s. at 86° F.

Another specific example is a product of Thiokol Chemical Corporation sold under the designation ZL-291. It is described as a fully saturated urethan polymer of the polyester type which contains 2.5 to 3.5% of isocyanate groups, by weight. It is an odorless, light amber semi-solid (at room temperature) having a specific gravity of 1.20. It can be reduced to liquid form suitable for use according to the present invention by heating to a temperature of about 120° F. Other urethane polymers which are liquid at room temperatures or which can be reduced to liquid form by application of moderate temperature are well known in the art.

Such liquid urethane polymers may be cured by compounding them with curing agents such as diamines, polyols or catalysts known in the art, or merely by reaction with moisture in the air. They can be set and cured at normal room temperature or at elevated temperatures, the setting and curing times depending on the curing agent and temperature. For use in practicing the present invention, I prefer to cure at room temperature, or at temperatures below the point where deleterious effects on the tensioned rubber windings of the center begin to be observed. This point will vary somewhat, depending on the characteristics of the rubber and the tension applied thereto, but in general, temperatures in excess of 175° F. should be avoided at all times during the molding, setting and curing of the cover, for at temperatures above that point damage to the tensioned rubber is usually observed.

Referring to the drawings, the mold comprises two pieces 1 and 2, preferably hingedly connected by hinge pin 3 to form a so-called book mold. Each mold half has a hemispherical mold cavity 4, 4′ formed therein. The diameter of each mold cavity is the desired outside diameter of the finished covered ball, for example, 1.68″ for conformance with the standards prescribed for tournament play in the United States. Each mold cavity is also provided with a multiplicity of small protrusions 5 of usual size and shape as required to form the usual "dimples" in the outside surface of the ball. Only a few of such protrusions are shown in the drawings by way of example, it being understood that such protrusions would be distributed over the spherical surfaces of the mold cavity in accordance with usual practice.

In covering a golf ball according to the present invention, a metered quantity of liquid urethane polymer 6 is first deposited in the cavity 4 of the mold half 1 as shown in FIG. 1, the quantity deposited preferably being slightly in excess of that required to form one-half of the finished cover.

Figure 4:
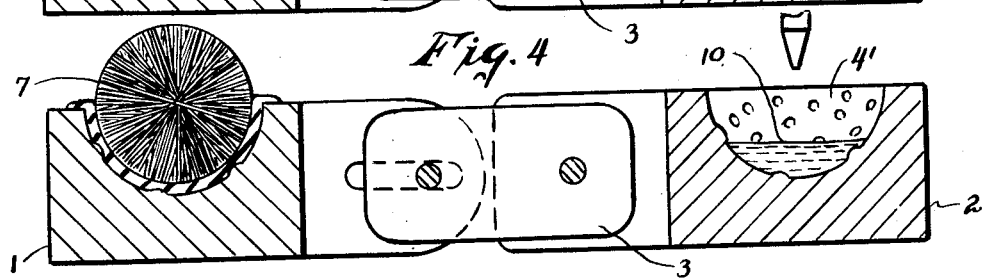
FIGURE 4 is a similar view showing the center suspended in the mold cavity, with a metered quantity of liquid polymer deposited in the cavity of the other mold half.

A wound golf ball center 7 is then placed in the mold cavity and is centered in the cavity while being pressed downwardly until the center is concentric with the mold cavity as shown in FIG. 4. As a result of this operation, the polymer in the cavity is caused to flow upwardly, filling the space between the center and the cavity and preferably overflowing slightly, as shown. A convenient means of handling the center during this operation is a suction cup 8, secured to a spindle 9 mounted for vertical reciprocating movement. The spindle is preferably hollow so that suction may be applied to the cup and released, as desired. After the center is properly located concentrically within the mold cavity, it is held in this position to await partial polymerization of the cover material. If the polymer has been compounded with a quick setting curing agent, a period of from five to thirty seconds is usually sufficient to set the polymer to a degree which will suspend the center in fixed position concentrically within the mold cavity during the remaining operations.

Figure 5:
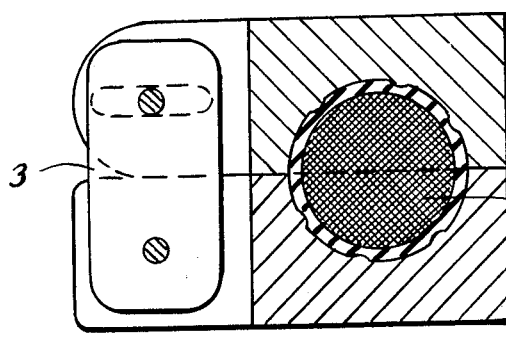
FIGURE 5 is a similar view showing the closed mold.

After the polymer is set sufficiently, the suction cup 8 is released from the center. Meanwhile, a metered quantity of liquid urethane polymer 10 is deposited in the cavity 4′ of the mold half 2, the quantity again being preferably slightly in excess of that required to form one-half of the finished cover. The mold half 1 is then swung through 180° on the hinge pin 3 to close the mold as shown in FIG. 5. The mold may then be held closed by any suitable form of clamp for a sufficient period to set the polymer sufficiently to permit removal of the ball from the mold without damage to the cover. A period of from 1 minute to 1 hour will be sufficient depending on the particular polymer and the particular curing agent used. Complete curing may be effected after removal from the mold.

It is very desirable that golf ball cover stock be white, because, even though it is universal practice in the industry to paint the cover with white paint, the paint coating frequently wears or chips off in normal use. If desired, therefore, the liquid urethane polymer, which is usually brown in color, may be whitened by the addition of a suitable white pigment such as titanium dioxide, for example. A maximum of twenty parts of titanium dioxide to one hundred parts of the polymer are sufficient to whiten the polymer.

It is also desirable to coat the mold surfaces with a suitable mold release in order to facilitate removal of the covered balls from the mold. Many mold releases are available in the commercial market, but I prefer to use a product manufactured by Peninsular Silicones, Inc. and sold under the designation MR–22, or a product manufactured by General Electric Co. and sold under the designation SR–53. Alternatively the mold surfaces may be coated with a polyfluorinated hydrocarbon sold under the name Teflon.

Specific examples of the practice of the method are as follows:

*Example I*

A mold such as previously described was used at room temperature of approximately 75° F.

Figure 3:
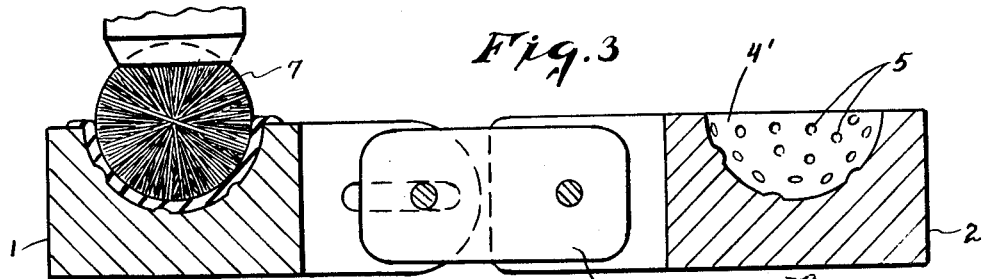
FIGURE 3 is a similar view showing the center placed concentrically in the mold cavity.

A mixture of one hundred parts of Adiprene L, twenty parts of titanium dioxide and eight parts of a diamine curing agent referred to in the art as $MD_A$ (4,4′-diamino diphenylurethane) was prepared and about .25 cu. in. of the mixture was deposited in the mold cavity 4. A wound golf ball center having a diameter of 1.62″ was then placed in the mold cavity 4 and pressed downwardly until the center was concentric with the mold cavity as shown in FIG. 3. The center was held in this position for approximately three minutes to allow the polymer to set sufficiently to suspend the center in concentric position. The center was then released. An additional quantity of the polymer mixture was then introduced into the mold cavity 4′ as shown in FIG. 4. The mold was then closed as shown in FIG. 5, with pressure applied to the mold in any conventional manner to hold it closed. The mold was kept closed for a period of five minutes, after which the covered ball was removed from the mold. Thereafter the cover was allowed to cure at room temperature for two weeks. The cover was then observed to be strong and tough and highly resistant to damage by impact with a golf club. It was adhered tightly to the ball.

*Example II*

A mold as previously described was used at room temperature of approximately 75° F.

A mixture of one hundred parts of the urethane polymer ZL–291, 10 parts of titanium dioxide and 4.2 parts of a polyol manufactured and sold by Wyandotte Chemical Corp. known as Quadrol [N,N,N′,N′-tetrakis (2-hydroxy propyl) ethylene diamine] was prepared and about .25 cu. in. of the mixture was deposited in the mold cavity 3. The mixture was warmed to a temperature of about 120° F. to make it readily flowable. A golf ball center having a diameter of 1.62″ was then centered in the mold cavity in the manner described in Example I, and thereafter the procedures of Example I were followed.

It will be understood that the invention may be variously modified and embodied within the scope of the subjoined claims.

I claim as my invention:

1. The method of covering a golf ball by applying covering material to a spherical center having an outside layer of rubber strand wound under tension, which comprises depositing a metered quantity of liquid urethane polymer into a mold half having a spherical mold cavity therein of a diameter greater than the diameter of the center, pressing said center into said polymer until said center is concentric with said cavity, holding said center on a support exterior of said cavity in such concentric position within but spaced from all portions of the surface of said cavity until said polymer is set sufficiently to suspend said center in fixed position concentric with said cavity during the remaining operations, depositing a metered quantity of liquid urethane polymer into a second mold half having a spherical mold cavity therein of a diameter equal to the diameter of said first mold half, and assembling said mold halves in concentric registration to close said mold cavity, said center being held in concentric position during and after closing the mold solely by the set condition of the polymer in the first mold half.

2. The method claimed in claim 1, in which said mold halves are assembled by inverting said first mold half and pressing the exposed portion of the spherical center into the liquid polymer in the cavity of said second mold half.

References Cited in the file of this patent

UNITED STATES PATENTS

| 2,117,400 | Cobb | May 17, 1938 |
| 2,639,252 | Simon et al. | May 19, 1953 |
| 3,045,284 | Peras | July 24, 1962 |

FOREIGN PATENTS

| 23,306 | Great Britain | 1909 |